Patented Aug. 9, 1927.

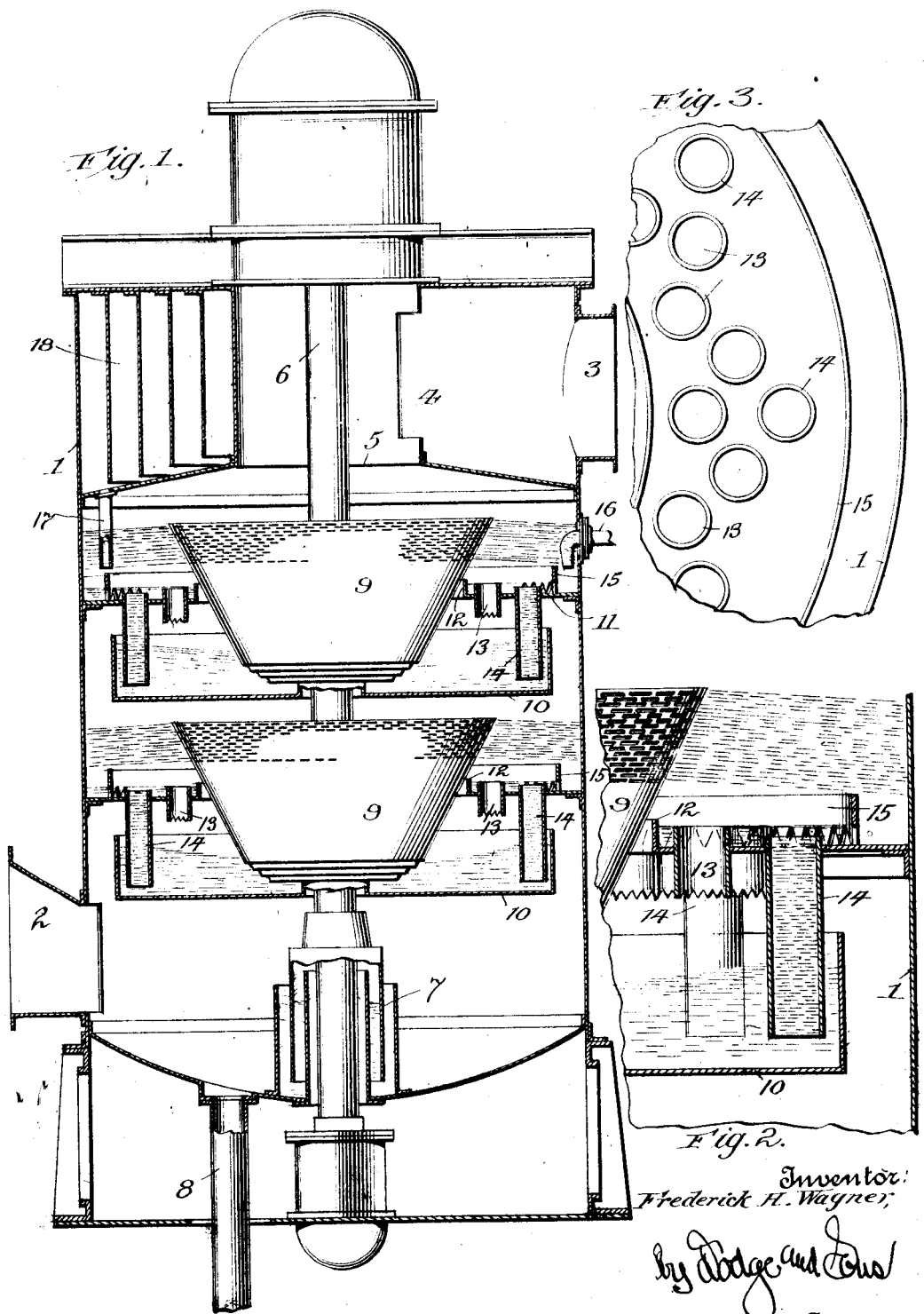

1,638,670

UNITED STATES PATENT OFFICE.

FREDERICK H. WAGNER, OF BALTIMORE, MARYLAND, ASSIGNOR TO THE BARTLETT HAYWARD COMPANY, OF BALTIMORE, MARYLAND, A CORPORATION OF MARYLAND.

LIQUID AND GAS CONTACT APPARATUS.

Application filed June 17, 1925. Serial No. 37,794.

This invention pertains to an improved liquid and gaseous contact apparatus and is of that type generally denominated as a "scrubber".

The invention is illustrated in conjunction with a scrubber of the Feld type, as shown for instance in Letters Patent No. 983,037, dated January 31, 1911.

The main object of the invention is to provide means for securing a more intimate and prolonged contact between the liquid and gas than is obtained with the construction set forth in the patent above noted and to that end I employ means for gathering the sprayed liquid before it is returned to the receptacle for re-pumping and re-spraying, and effecting an intimate contact between such re-gathered liquid and the gas flowing upwardly through the scrubber.

The invention is illustrated in the annexed drawings wherein:

Fig. 1 is a vertical sectional elevation of a scrubber embodying my invention;

Fig. 2 an enlarged detail sectional view; and

Fig. 3 a plan view of the gathering plate and the trickling tubes for the re-gathered liquid.

In the drawings, 1 denotes the usual shell or casing provided at its lower end with a gas inlet 2 and at its upper end with the gas discharge port 3. The latter opens into a moisture eliminator chamber 4 into which the gas passes through the centrally disposed opening 5.

A revoluble shaft 6 extends upwardly through the casing and is driven through suitable means (not shown). At its lower end shaft 6 is provided with a packing or liquid seal 7 to prevent the escape of gas therearound. A suitable draw-off 8 for liquid is provided at the base of the casing.

In Fig. 1 I have illustrated two spraying mechanisms but a greater or less number may be employed and inasmuch as they and their allied parts are alike in form a description of one will suffice.

Secured to the shaft is a series of spaced and inverted truncated cone-shaped pumping and spraying elements designated generally by 9, the outermost one of which, at least, is perforated adjacent its upper end. The lower ends of said members extend down into a receptacle 10 and into the liquid contained therein. Said receptacle is spaced away from the wall of the casing so that the gas may flow upwardly around the same.

Secured to the inner wall of the casing at a point above the pan and below the line of spray thrown outwardly by the members 9 is a horizontally disposed plate 11, said plate having a central opening about which extends an upstanding collar 12. The upper edge of said collar stands close to but out of contact with the adjacent cone 9 and thus the plate prevents the gas from flowing freely up through the structure.

The plate is provided with a series of openings in each of which there is mounted a tube 13, the tube extending above the plate and preferably below the same, as shown in Figs. 1 and 2, the lower end preferably being serrated.

Pipes 14 also extend through the plate being overflow pipes, the lower ends whereof extend down into the liquid in the underlying pan and are always filled with liquid when the apparatus is in operation, thus being sealed against upflow of gas therethrough. Full flow through this pipe is maintained by having its weir level slightly below the weir level of the tubular members or orifices 13.

Extending around the plate 11 adjacent the wall of the casing is an upstanding plate 15, the lower edge whereof is notched or serrated. This plate serves to prevent the spray, or the body of liquid formed therefrom, from surging over the plate or diaphragm 11 and interfering with the action of the tubular orifices 13. The plate, along with pipe 14, serves to prevent flooding of the tubes 13.

A supply pipe 16 for the liquid enters the upper portion of the apparatus and discharges onto the uppermost plate or diaphragm 11. A drain pipe 17 is provided for the eliminator chamber 4.

In action, assuming that the pans or receptacles 10 have the requisite amount of liquid therein, such liquid will be pumped up and sprayed laterally by the elements 9 when the shaft 6 reaches the requisite speed. The liquid will be thrown outwardly from the perforate portion of the outermost member 9 in the form of a spray against the wall of the casing. It then flows down upon the plate or diaphragm 11, overflowing said plate to such a level that the liquid will pass down in a film upon the inner surface of each of the pipes 13, the pipes 14 being likewise filled by the overflow.

As above noted, the plate 15 will prevent the liquid from surging inwardly over the plate 11 and hence an even distribution of the liquid is obtained over the plate 11 with a consequent even flow of the liquid through the trickler tubes 12. The gas passing upwardly through the apparatus must of necessity pass upwardly through the tubes 13 in counter-flow to the film of liquid passing downwardly along the inner walls of such tubes. The liquid will of course drop off the end of the tubes in the form of rain, hence the gas first contacts such rain of liquid, then comes into intimate contact with the surface of the liquid flowing down through the trickler tubes, and must pass through the outwardly thrown spray, which, as will be seen upon reference to the drawings, is above the mouth of the tubes. The gas after passing through the uppermost spray chamber passes through port 5 into the eliminator chamber 4 which is provided with any approved moisture eliminating means, as plates 18, and finally to discharge port 3. The pipes 14 will prevent the liquid from overflowing into the tubes 13 to such an extent as to fill, or substantially fill, the same. In other words, the weir levels of these members are such that the action just mentioned will always inhere.

If the liquid is constantly fed in through the pipe 16, the uppermost pan or receptacle 10 will of course overflow, and such overflow passes down to the next succeeding pan, consequently the gas passing upwardly from the lower series of trickler tubes will pass through the liquid running off of said overflowing pan.

While I have disclosed and described liquid elevating and spraying means of the so-called "Feld" type, it is to be understood that any equivalent mechanism may be employed to effect the same object.

The apparatus lends itself to the washing of gases or the absorption of gases, or in fact any operation wherein liquid and gaseous contact is necessary or desirable.

What is claimed is:

1. In an apparatus of the character specified, the combination of a casing; a receptacle located therein with its edges in spaced relation to the wall of the casing; means extending into said receptacle for withdrawing a liquid therefrom and spraying the same outwardly; a diaphragm extending inwardly from the wall of the casing at a point above the receptacle, said diaphragm receiving the liquid flowing from the spray; and a series of tubular members extending through the diaphragm through which the liquid passes from the diaphragm and through which the gas undergoing treatment also passes in counterflow to the liquid.

2. In an apparatus of the character specified, the combination of a casing; a receptacle located therein with its edges in spaced relation to the wall of the casing; means extending into said receptacle for withdrawing a liquid therefrom and spraying the same outwardly; a diaphragm extending inwardly from the wall of the casing at a point above the receptacle, said diaphragm receiving the liquid flowing from the spray; a series of tubular members extending through the diaphragm through which the liquid passes from the diaphragm and through which the gas undergoing treatment likewise flows in counter-current to the liquid; and means for maintaining the desired level of liquid on said diaphragm.

3. In an apparatus of the character specified, the combination of a casing; a receptacle located therein with its edges in spaced relation to the wall of the casing; means extending into said receptacle for withdrawing a liquid therefrom and spraying the same outwardly; a diaphragm extending inwardly from the wall of the casing at a point above the receptacle, said diaphragm receiving the liquid flowing from the spray; a series of tubular members extending through the diaphragm and through which the liquid passes from the diaphragm in counterflow to the gas undergoing treatment; and means carried by the diaphragm to prevent flooding of the tubular members.

4. In an apparatus of the character specified, the combination of a casing; a receptacle located therein with its edges in spaced relation to the wall of the casing; means extending into said receptacle for withdrawing a liquid therefrom and spraying the same outwardly; a diaphragm extending inwardly from the wall of the casing at a point above the receptacle, said diaphragm receiving the liquid flowing from the spray; a series of tubular members extending through the diaphragm through which the liquid passes from the diaphragm; and a pipe also extending through the diaphragm, the upper end of said pipe being lower than the upper ends of the tubes, said pipe at its lower end extending down into the liquid within the receptacle.

5. In an apparatus of the character specified, the combination of a casing provided with a gas inlet port and a gas exit port; a shaft extending upwardly through the casing; a receptacle located within the casing and through which the shaft extends; means carried by the shaft and extending down into the receptacle for withdrawing liquid therefrom and spraying the same outwardly at a point above the receptacle; an annular diaphragm extending inwardly from the wall of the casing at a point above the receptacle and below the path of the spray which is thrown outwardly, said diaphragm being provided at its inner edge with an upstanding collar which stands in close relation to the means for withdrawing and spraying the liquid; a series of tubular members extending through the diaphragm, the upper ends of said tubular members being located at a point above the bottom of the diaphragm; and a pipe also extending through the diaphragm, the lower end of the pipe being submerged within the liquid contained in the receptacle, the weir level of the upper end of said pipe being lower than the corresponding level of the tubular members.

6. In an apparatus of the character specified, the combination of a casing; a receptacle located therein with its edges in spaced relation to the wall of the casing; a shaft extending upwardly through the casing and through the receptacle; a series of inverted cone-shaped elements secured to the shaft and rotatable therewith, the upper portion of the outermost cone being perforated; an annular diaphragm extending inwardly from the wall of the casing at a point, above the receptacle; a collar at the inner edge of said diaphragm, said collar standing in close relation to the outer cone-shaped member but out of contact therewith; an upright plate extending around the diaphragm adjacent the wall of the casing, the lower edge of said plate being provided with openings for the passage of liquid therethrough; a series of tubular members extending through the diaphragm; the upper end of each of said tubes lying in a plane above the diaphragm and the lower ends of the tubes extending below the lower face of the diaphragm and overlying the receptacle; and a pipe also extending through the diaphragm, the upper end of the pipe being in a plane lower than that of the upper end of the tubes, the lower end of the pipe extending down into the receptacle to a point below the level of the liquid contained in the receptacle.

In testimony whereof I have signed my name to this specification.

FREDERICK H. WAGNER.